United States Patent
Wucherer et al.

(10) Patent No.: US 6,950,715 B2
(45) Date of Patent: Sep. 27, 2005

(54) UNIVERSAL MOTION CONTROL

(75) Inventors: Klaus Wucherer, Winkelhaid (DE); Johannes Birzer, Stulln (DE); Karl Hess, Lichtenau (DE); Tino Heber, Freiberg (DE); Steffen Kirste, Dittersdorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/385,809

(22) Filed: Mar. 11, 2003

(65) Prior Publication Data

US 2003/0171831 A1 Sep. 11, 2003

Related U.S. Application Data

(63) Continuation of application No. 09/591,421, filed on Jun. 10, 2000, now Pat. No. 6,539,268.

(30) Foreign Application Priority Data

Jan. 10, 2000 (WO) .............................. PCT/DE00/00058

(51) Int. Cl.⁷ ............................................... G05B 11/01
(52) U.S. Cl. ........................ 700/118; 700/19; 700/61
(58) Field of Search .............................. 700/9, 19, 56, 700/61, 173, 168–169, 18, 23, 83, 86, 87; 318/567; 710/8, 11, 104

(56) References Cited

U.S. PATENT DOCUMENTS

| | | | |
|---|---|---|---|
| 4,135,239 A | 1/1979 | Hamill, III et al. | |
| 4,684,862 A | 8/1987 | Rohrie | |
| 4,947,336 A | 8/1990 | Froyd | |
| 5,025,385 A | 6/1991 | Froyd | |
| 5,162,986 A | 11/1992 | Graber et al. | |
| 5,291,391 A | 3/1994 | Mead et al. | |
| 5,452,201 A | 9/1995 | Pieronek et al. | |
| 5,485,400 A | 1/1996 | Warrior et al. | |
| 5,485,620 A | 1/1996 | Sadre et al. | |
| 5,659,480 A | 8/1997 | Anderson et al. | |
| 5,805,442 A | 9/1998 | Crater et al. | |

(Continued)

FOREIGN PATENT DOCUMENTS

| | | |
|---|---|---|
| DE | 197 40 550 A1 | 4/1998 |
| DE | 198 53 205 A1 | 6/2000 |

OTHER PUBLICATIONS

CNC–Steuerung Mit Integrierter SPS—Werkstatt und Betrieb, De, Carl Hanser Verlag, Munche, Bd. 128, Nr. ½, Feb. 1, 1995, Seite 80.

CNC–Bedienoberflachen Individual Gestalten—Fertigung Und Automatisierung, De, Carl Hanser Verlag, munchen, Bd. 88, Nr. 9, Sep. 1, 1993.

Object–Oriented Software Components and Containers, Process/Industrial Instruments and Controls Handbook, pp. 3.24–3.25, 1999.

Controllers, Process/Industrial Instruments and Controls Handbook, pp. 3.43–3.45, 1999.

Function Blocks Defined by Foundation Fieldbus Specification, Process/Industrial Instruments and Controls Handbook, p. 11.23, 1999.

*Primary Examiner*—Paul L. Rodriquez
*Assistant Examiner*—Alexander Kosowski
(74) *Attorney, Agent, or Firm*—White & Case LLP

(57) ABSTRACT

The basic available command library of the run-time system (RTS1–RTS4) of a universal motion control (combined SPS/NC control) can be expanded dynamically and according to the user's specific requirements by loading technology packets TP (with corresponding technology object types TO). Thus, a dynamic scaling of a universal motion control UMC is possible.

Figure 1:
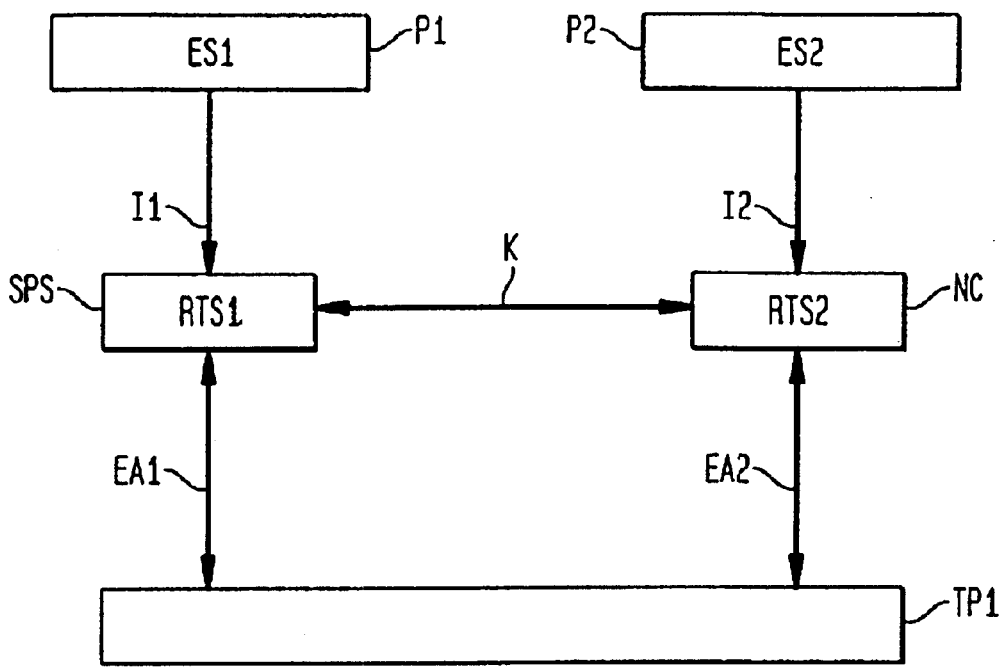

Due to a consistent integration and communication platform API, the functionality of extremely prepared technology packets TP can also be integrated into the control.

18 Claims, 5 Drawing Sheets

U.S. PATENT DOCUMENTS

| | | | |
|---|---|---|---|
| 5,838,968 A | | 11/1998 | Culbert |
| 5,841,654 A | | 11/1998 | Verissimo et al. |
| 5,844,804 A | * | 12/1998 | Schussler .................... 700/169 |
| 5,850,338 A | | 12/1998 | Fujishima |
| 5,877,959 A | | 3/1999 | Kamiyama et al. |
| 5,930,141 A | | 7/1999 | Kamiyama et al. |
| 5,933,638 A | * | 8/1999 | Cencik ....................... 717/131 |
| 5,999,990 A | * | 12/1999 | Sharrit et al. .................. 710/8 |
| 6,098,116 A | * | 8/2000 | Nixon et al. ................... 710/8 |
| 6,144,993 A | | 11/2000 | Fukunaga et al. |
| 6,198,246 B1 | | 3/2001 | Yutkowitz |
| 6,263,487 B1 | | 7/2001 | Stripf et al. |
| 6,327,628 B1 | | 12/2001 | Anuff et al. |
| 6,424,872 B1 | | 7/2002 | Glanzer et al. |
| 6,438,444 B1 | * | 8/2002 | Mizuno et al. ............. 700/169 |
| 6,449,528 B1 | | 9/2002 | Yamato |
| 6,470,225 B1 | | 10/2002 | Yutkowitz |
| 6,571,273 B1 | | 5/2003 | Shirai et al. |
| 6,631,301 B2 | * | 10/2003 | Focke et al. .................. 700/56 |

\* cited by examiner

UNIVERSAL MOTION CONTROL

This application is a continuation of U.S. patent application Ser. No. 09/591,421, filed Jun. 10, 2000, now U.S. Pat. 6,539,268, which claims the benefit under 35 U.S.C. §119 of the filing date of international patent application PCT/DE00/00058, filed Jan. 10, 2000.

The invention pertains to a universal motion control with an engineering system and a run-time system, which functionally combines the classical tasks of a programmable logic controller and a numerical controller.

It is common today to model different hierarchical run levels both for the programmable logic controller "PLC" and also for the motion control "NC", wherein the software tasks of the run levels are allocated to control the particular technical process.

These tasks can fulfill system tasks, but they can also be user-programmed.

It is also known that for a programmable logic controller PLC, and also for a motion controller NC, application programs or tasks prepared by the user can be loaded into the memory of the particular controller and then executed.

From DE 197 40 550 A1 it is known that process control functionalities of the programmable logic controller PLC and motion functionalities of NC controller can be integrated into a consistently configurable control system. This PLC/NC-integration takes place in the form of the interconnection of PLC and NC control assemblies.

But in this design of the integration, an optimum and efficient task structure cannot be obtained for the control tasks. In addition, with regard to process control, and also with regard to the motion control, expanded functionality can only be loaded afterwards in the form of application programs and then executed.

Therefore, the invention is based on the problem of creating optimum operation of the combined PLC/NC control in a simple manner for different control problems and different initial conditions or requirements of the underlying technical process, both with regard to their control structure and also with regard to their functionality.

The inventors thus began with the idea that by means of a consistently configurable run-level model for the control tasks of the combined PLC/NC control and the possibility of dynamic loading of function code into the run-time system and/or engineering system of the control, an optimum operation of a universal motion control must be possible.

According to this invention, the problem stated above for a motion controller of the type defined above, is solved in that it has several run levels of various types with different priorities, wherein different user levels and system levels are provided, from greatest to lowest priority, and that technology packets can be loaded on the user side into the engineering and/or run-time system, wherein these packets contain:
a) code parts, which represent the specifics of the rules for the run-time system, and
b) a configuration part which contains the allocation of these code parts to the particular system levels, and also their processing sequence, where
c) if necessary, this information of the configuration part can be passed along to the engineering system.

In addition to a reduction in the communications expense within the tasks of the control, and the simplified programming of process control and motion control in a consistent programming language with a consistent preparation interface, an important advantage of the invention resides in the fact that, by loading of software, the potential for scalability will appear for the run-time system of the control. Thus, the user can begin from a base system of the control and expand the available command library of this base system dynamically, depending on the particular requirements of the fundamental technological process or the control task. In this case, the base system forms the scope of operations of the run-time system of a controller, namely a real-time operating system, a run system (with system levels and applications levels), technology object types, programming language commands, the PLC available command library as well as communication interfaces (e.g., LAN, E/A) and technology interfaces (e.g., drives, transducers) for the technical process. Therefore, in the base system we find the necessary basic functionality of a controller. Thus base system can run on different HW platforms (e.g., PC, driver, . . . ).

Another advantage resides in the development and in the production of these scalable universal controls. Controls that are supplied with a necessary baseline functionality (base system) can be easily produced in large quantities (economies of scale).

The user can then expand the existing baseline system by those specific functionalities that are actually needed for his applications.

A first embodiment of the invention resides in the fact that each technology packet contains an adapted number of technology object types for the run-time system.

Thus it is possible to load in even complex and demanding control functionalities in a concise and understandable form to the run-time system.

An additional preferred ebodiment of the invention resides in the fact that the additional operator interface information, in particular the operating parameters and/or programming language features and/or declaration parts can be allocated to the code parts.

This results in the following advantages:

In order to be able to use a technology object type not only as no longer changeable constants, the technology object type must inform the initial system of the possibilities for parameterization for its particular technology objects, and in particular, the available operating parameters. Thus, the user has the possibility to provide flexible parameters to a technology object in the interface of the initial system.

Because even programming language features can be loaded into the run-time system, it is possible that the available command library of the run-time system can be expanded dynamically. In user program, the user can use this kind of loaded command as if it were a command of the base functionality of the base system.

If an user program with a loaded command of this type is processed within an user level of the run-level model, then when this loaded command is called, the associated code sequence of the operating system can be processed at one of the system levels of the run-level model. This takes place without any intervention of the user. Due to the allocation of declaration parts and description parts to the code parts of the technology packet, the flexibility for the user will be further increased.

An additional favorable configuration of the underlying invention resides in the fact that commands, which expand the scope of the programming language of the engineering system are present in the technology packet, and can be used by the operator if necessary. Thus, the available command library of the engineering system can be expanded by commands and operators that are necessary for manipulation of the technology objects of the loaded technology packet. This expanded available command library is tailored to the particular loaded technology packets. Thus, the user can easily use the functionalities of the loaded technology object types in his user programs.

An additional favorable configuration of the underlying invention resides in the fact that the control has an interface for the injection of technology object types. This interface can be used as a middleware platform in order to load functionalities of industry-specific technologies (e.g., coiling of springs, injection molding, etc.) in the form of technology object types. These loadable technology object types need not be proprietary, but rather they can be produced by external manufacturers or suppliers. Thus the user is no longer restricted to the control supplier for the expansion of the functionality of his control. Due to the consistent and open interface he can easily integrate specific commercially available technology objects on a plug & play basis into his existing control.

The essential advantages attained with the invention thus consist in particular in the fact that in a consistently configurable run-level model of a universal motion control, i.e., of a combined PLC/NC control, new functionalities can be very easily incorporated because so-called technology packets can be loaded dynamically. First, these technology packets contain elements that dynamically expand the command set of the underlying run-time system, and second, they contain programming language features that can be used in the engineering system by the user for certain of his user programs. A control of this type can thus be delivered with a base functionality so that common control tasks can be carried out. The user can build successively on this base to expand the functions so that the control functionality that is actually needed will be created. In the controls common today, a functional configuration is automatically supplied which is needed by only a fraction of users. Normally a user will not need a majority of the commonly supplied control functionality for his tasks and user. But if a user needs specific control functionalities, then he has to use the available programming language of the control to make his own complicated and cumbersome user program. Then he can load a self-prepared user program into the run-level model of the run-time system into an user level. But in the underlying invention, this problem is solved in that additionally required, specific functionalities are loaded in the form of technology packets into the system level of the run-time system and not into the user level. In the present invention the command set of the base-system or run-time system can be expanded by loading programs. These loaded commands can then be used by the operator of the engineering system and because these newly loaded commands are executed in the system level, it is possible for them to be executed very quickly.

Another important advantage rests in the fact that due to an open interface, a platform, is created into which not only proprietary, but also externally produced technology objects can be easily integrated. Thus, the prerequisite is created for a market for technology objects with specific requirements, operations and functionalities.

A design example of the invention is presented in the figures and will be explained in greater detail below.

Figure 8:
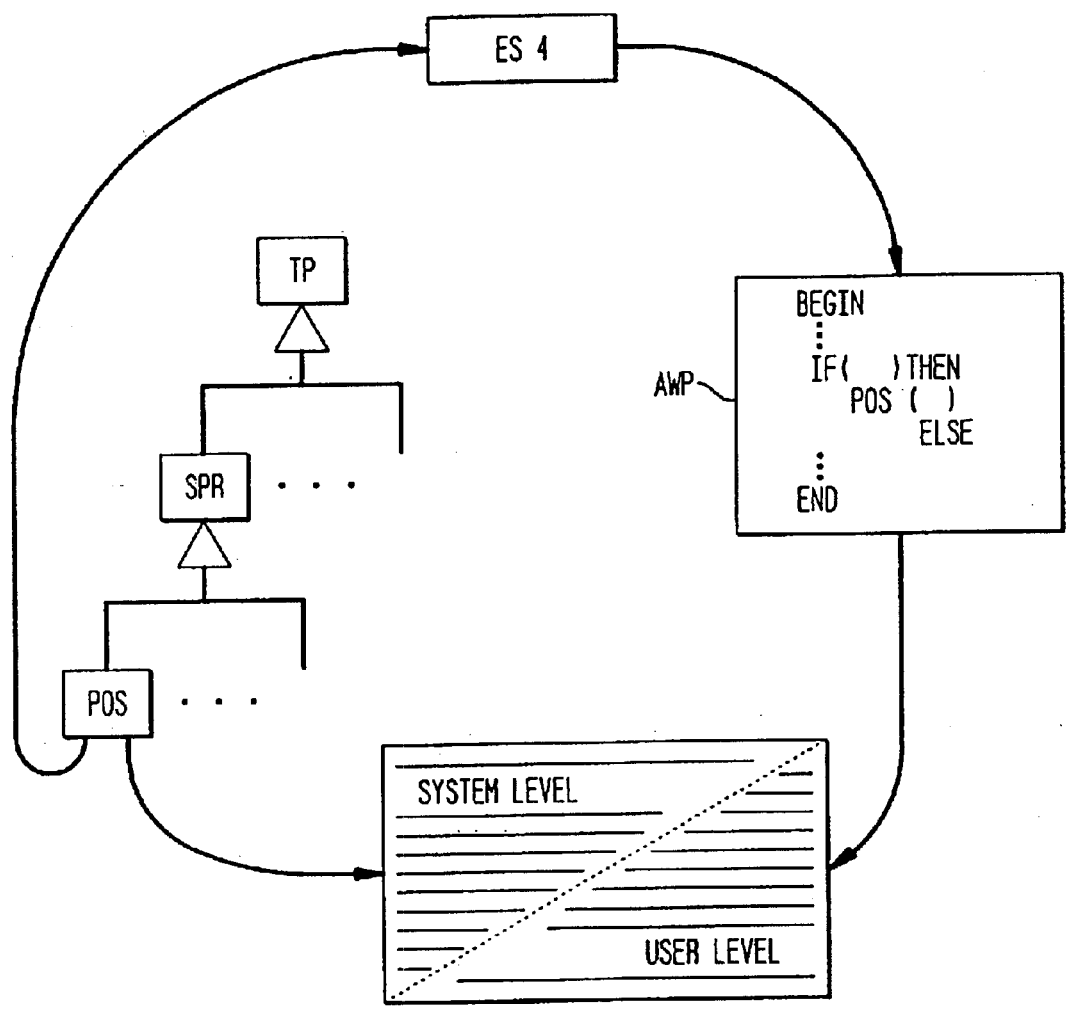
Figure 9:
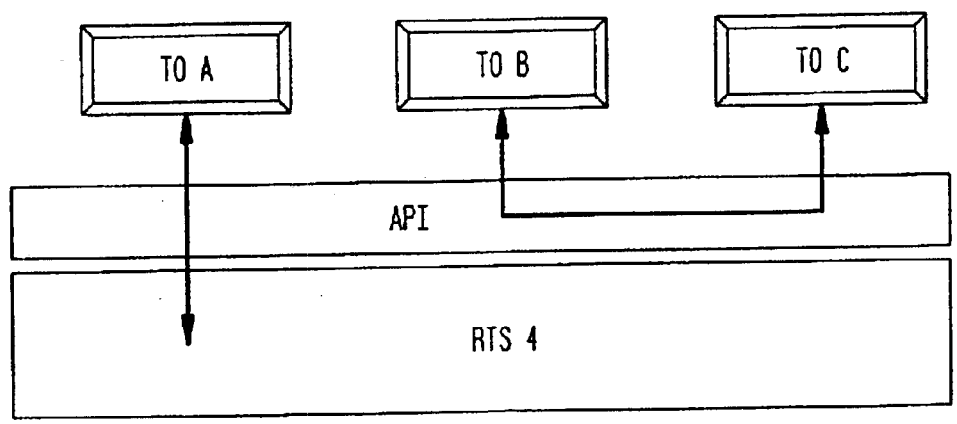

Shown are:

FIG. 1, known control of a technical process with separate-programmable logic controller and motion controller. The programming takes place by means of separate programming systems, FIG. 2, the essential run levels of a classical programmable logic controller, FIG. 3, the essential run levels of a motion controller, FIG. 4, a universal control, i.e., a combined PLC/NC control with an associated programming system, FIG. 5, the run-level model of the universal control, FIG. 6, a technology packet shown by means of an OO (object-oriented) structure diagram comprising code part, parameters, firmware configuration, technology object type, programming language features and declaration part, FIG. 7, technology object types for a plastics technology packet shown by means of OO-structure diagram, FIG. 8, shows how the loaded command positioning POS of a technology packet in the engineering system can be used by the user in his user programs and how it is executed in the run levels of the control, and FIG. 9, shows the run-time system of a control with Application Program Interface (API) as a consistent interface and communications platform for technology object types.

In the illustration according to FIG. 1, a block diagram is used to show that to control a technical process TP1, that is a parallel operation of a programmable logic controller PLC and a motion controller NC. Programmable logic controller PLC and motion controller NC each contain a run-time system RTS1 or RTS2. The communication between the two controllers takes place by means of special aids, and a bidirectional communications channel K is shown as an example. The programming of the controls by the user is done, as a rule, in different programming languages with different front-end development tools. This means that separate programming or engineering systems P1, ES1 and P2, ES2 are used. The main disadvantage of this conventional design resides, first, in the complicated communication between the two controls, and second, in the separate and different programming or engineering systems P1, ES1 and P2, ES2. The actual technical process TP1 is controlled by means of the inputs and outputs EA1, EA2 of the controls. There are information paths I1 or I2—by means of which the programs are loaded into the particular controller-between the programming system P1 and the programmable logic controller PLC, or between the programming system P2 and the numerical control NC.

Figure 2:
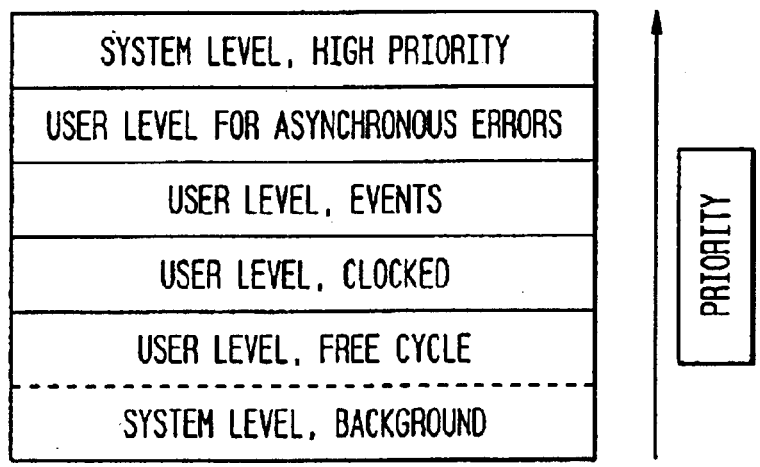

The illustration according to FIG. 2 shows the essential run levels of a classical programmable logic controller (PLC; FIG. 1), arranged according to their priority. In this case, the increase in priority is symbolized by an arrow. At the lowest priority level, as indicated by a dashed line, there are two different tasks, namely a free cycle, i.e. "user level, free cycle" and a background system level, i.e., "system level, background," will be processed in a Round Robin method, that is, time-slot controlled. The background system levels are allocated communications tasks, for example. In a following clocked user level, designated as the "user level, clocked," the polling clock of the task or of the program of this level can be parameterized. Then comes a monitoring step to determine whether the processing of the user program at this clocked level has been completed in a timely manner before a start event appears again. If the clock time expires without the user program of the allocated level finishing its processing then a corresponding task will be started for the next high priority "user level for asynchronous errors." In this "user level for asynchronous errors" the user can program the handling of the error states.

After the "user level clocked" there follows a "user level, events." The response to external or internal events (events) takes place within the "user level, events." A typical example for this kind of event is the exceeding of a limit value. There are tasks of the operating system which secure the operating mode of the programmable logic controller are located in a "system level, high-priority."

Figure 3:
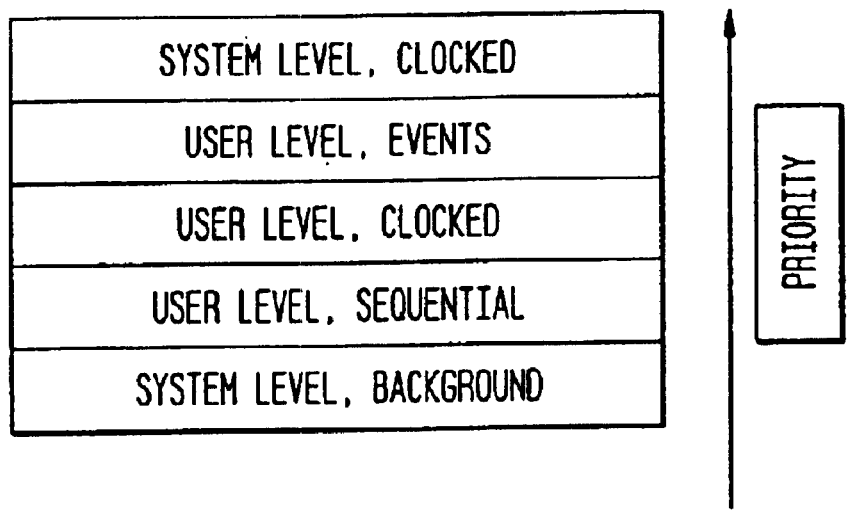

The illustration according to FIG. 3 shows the essential run levels of a motion controller (NC; FIG. 1). Here, too, the individual levels are arranged according to their priority, as indicated by an arrow. A "system level, background" and a "user level, sequential" have the same priority, namely the lowest. This task-oriented relationship is indicated by a dashed line as in FIG. 2. The tasks of "user level, sequential" are processed together with the tasks of the "system level, background" in a Round Robin method. For example, some typical tasks for the "system level, background" are those required for communication. The program units programmed by the user for the actual control task are executed at the "user level, sequential." If the control in one of these program units conflicts with a motion or positioning command, then a suspend command is generated, i.e., the user program will be interrupted at this point. Processing of this motion or positioning command occurs in a highest-priority "system level, clocked." Every position controller running in the "system level, clocked," executes this motion or positioning command. After execution of the command, the program will return to the "user level, sequential" and the user program interrupted by the suspend command will continue at the same location by means of a resume command. The "system level, clocked" contains the already-mentioned position controllers and also the interpolation part of the control.

At the lowest-priority level there is a "user-level, clocked." This is where periodic tasks are executed, such as controller functionalities.

Tasks that respond to external or internal events are located in the following "user level, events." These events can be alarms, for example.

Figure 4:
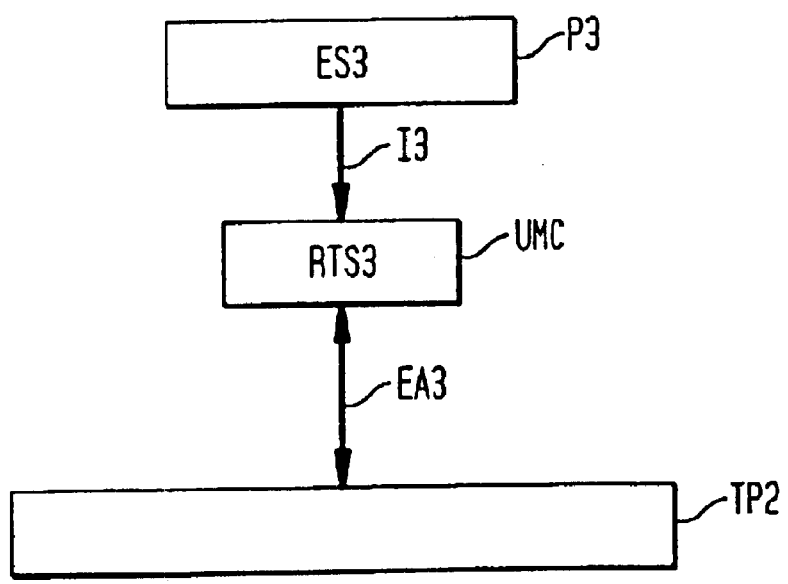

In the illustration according to FIG. 4, a technical process TP2 is controlled by a combined PLC/NC controller UMC. The acronym UMC stands for UNIVERSAL-MOTION-CONTROL. The link between the controller UMC and the associated technical process TP2 is bidirectional by means of inputs/outputs EA3. Programming of the combined PLC/NC control is done by means of a common programming system P3 or engineering system ES3, and the engineering system ES3 has a user-friendly interface, like that in FIG. 1, for the programming system P3. The programs prepared with it are passed over an information path I3 into a run-time system RTS3 of the universal motion controller UMC.

Figure 5:
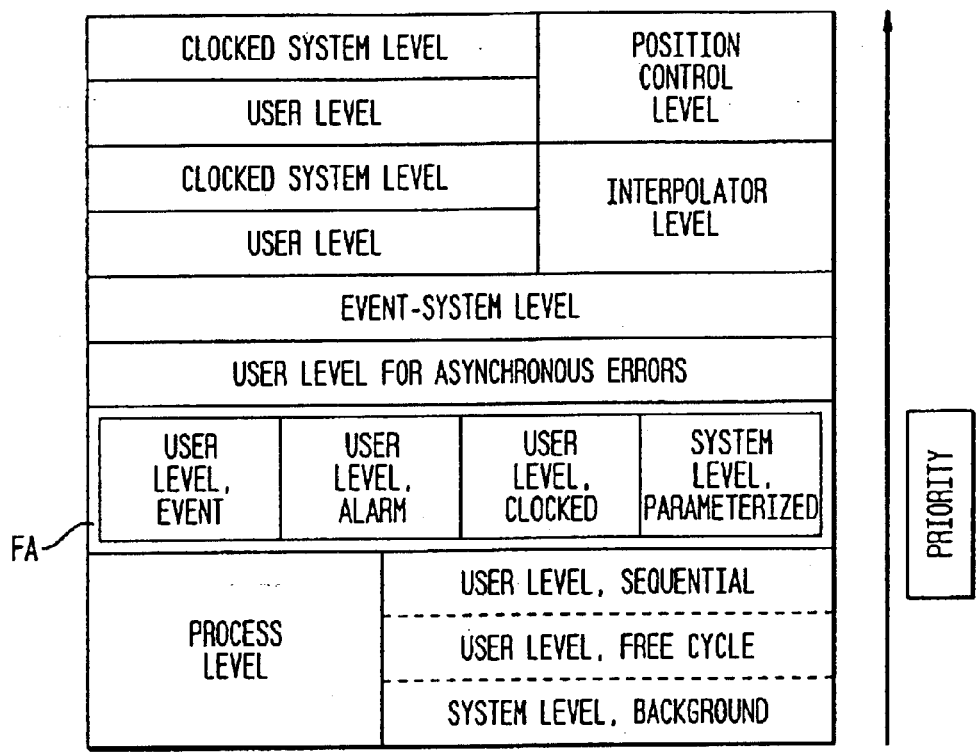

The illustration according to FIG. 5 shows the run level model of the universal motion control. Prioritizing of the levels is indicated by an arrow, which points in the -direction of highest priority, as before. The lowest-priority level group is the so-called "level group, background processing." It consists of a "system level, background," a "user level, free cycle" and a "user level, sequential." The tasks of these three same-priority levels (indicated by the dashed boundary lines) are processed cyclically in a Round Robin method. (Details on this are presented below in conjunction with FIG. 8.) The higher-order "run level" following the "level-group, background processing" is a user-configurable user level FA according to the user's requirements; it is identified by a double border and is used for alarm and/or event and/or control and/or other periodic tasks. This user level FA thus consists explicitly of four types of levels, which, in turn, can be sorted with regard to priority within the user level FA.
Type 1: User level, event
Type 2: User level, alarm
Type 3: User level, clocked
Type 4: System level, parameterized Levels of these types can be placed by the user within the user level FA, based on user-defined priorities. In this way, the user can achieve an optimum execution of the universal motion control according to the requirements and initial conditions of the control task and the technical process to be controlled.

For instance, tasks can be placed in the "user level, event" which respond to inputs from the peripherals. "User level, alarm" contains tasks that respond to values exceeding the set limit. The "user level, clocked" contains periodic, user-programmable tasks. Externally loadable programs can be integrated into the "system level, parameterized." Thus it is possible that the universal motion control can be expanded dynamically by additional technological functionalities. The "system level, parameterized" usually loads tasks for slow control tasks or monitoring tasks (e.g., tasks with cycle times in the range of 100 ms).

The level with the next higher priority in the run-level model of the universal motion control is a "user level for asynchronous errors." At this level the user can program the handling of error states, similar to a programmable logic controller. The "user level for asynchronous errors" contains tasks that respond to technology alarms, for example. Thus, the user has the opportunity in this "user level for asynchronous errors" to supply parameters for the specific number of levels needed for the particular product. For simplicity, details of this process are not provided in the illustration. Thus the user can assign a particular priority to certain error events as needed.

Next comes the "event system level." Tasks at the "event system level" respond to critical internal or external events, such as an Emergency Stop command.

The next level is an "interpolator level." It includes a "clocked system level" and a "user level."

The highest-priority level is the "position control level." It too, contains a "clocked system level" and a "user level." The user levels at the position control and interpolator level contains tasks that are polled in the position control clock or interpolator clock. The run time of these tasks is monitored; if a time specified by the system is exceeded, this causes an interrupt of the level and the triggering of an asynchronous error in the "user level for asynchronous errors."

The position controller has a higher priority than the interpolator, i.e., the position controller cannot be interrupted by the interpolator, but the position controller can interrupt the interpolator.

In the run-level model of the universal motion control, additional prioritized layers, in addition to those already mentioned, can be provided, in principle, within the individual run levels.

Figure 6:
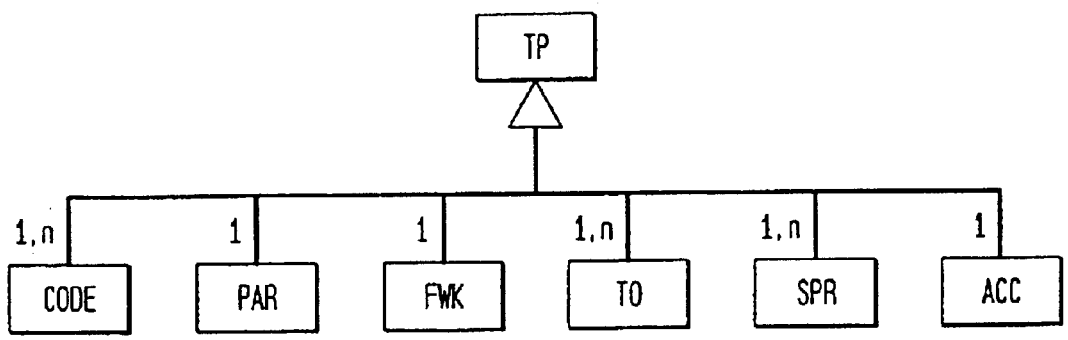

The illustration according to FIG. 6 shows an OO structure diagram, wherein the associated quantities are indicated by a common numeric notation; a technology packet TP with its constituents:
a) Executable code parts (Code)
b) Parameters (PAR)
c) Firmware configuration (FWK)
d) At least one technology object type (TO)
e) Programming language features (SPR)
f) Declaration part and description part (ACC)

The 1 to n code parts (e.g., C-functions) are used, for example, for motion control or for position control or for a different technology. The code parts can also contain commands for temperature control, temperature tracking or for special technologies, such as presses or processing of plastics, for example. The firmware configuration FWK is used to specify how these code parts are to be inserted in the run-level model of the control at the system levels and in what sequence they arrive for processing, i.e., execution.

Thus, this configuration contains the information that shows what system level is used for integration of a code part and if several code parts are integrated into one system level, and it shows what sequence is used to process these code parts.

The parameter part PAR contains interfaces (masks, combo-boxes, rules for the interdependence of parameters, . . . ) for the engineering system (ES; FIG. 1, FIG. 4, FIG. 8) and also the mechanisms for the run-time system (RTS; FIG. 1, FIG. 4, FIG. 9) which allow assignment of parameters. Thus the user can assign parameters to types of technology objects TO of a technology packet TP according to the current requirements.

By means of the 1 to n programming language feature of one technology packet TP, the available command library of the engineering system (ES; FIG. 1, FIG. 4, FIG. 8) can be expanded with commands and operators which are adequate and meaningful for the underlying technology packet TP with its associated 1 to n technology object types TO. Programming language features SPR must be loaded into the engineering system (ES; FIG. 1, FIG. 4, FIG. 8) and into the run-time system (RTS; FIG. 1, FIG. 4, FIG. 9) of the control. After these programming language features (e.g., "elevated temperature") have been installed in the engineering system (ES; FIG. 1, FIG. 4, FIG. 8), they are known in the compiler and in the interface or in the browser of the engineering system (ES; FIG. 1, FIG. 4, FIG. 8) and can be used directly by the operator in his user programs. By using plug & play technology, it is assured that known programming language features will also be present in the engineering system (ES; FIG. 1, FIG. 4, FIG. 8) as executable code parts in the run-time system (RTS; FIG. 1, FIG. 4, FIG. 9). Thus the operator will use the specification of the programming language features and need not bother with the implementation in the run-time system (RTS; FIG. 1, FIG. 4, FIG. 9). In FIG. 8, which will be discussed below, the interplay of loading, use and processing of programming language features SPR by technology packets TP will be explained in greater detail.

Back to FIG. 6: the ACC component of a technology packet TP contains a description of all programming language elements included in the technology packet TP, and a description of all the system variables and all the types that are used in the technology packet TP. The ACC component thus corresponds to a declaration part and description part for the technology packet TP. This ACC component is loaded first into the run-time system (RTS; FIG. 1, FIG. 4, FIG. 9) of the control. This will assure that all information relative to existing technology packets TP and technology object types TO are found in the run-time system of the controller, and thus the connection of operator devices and monitoring instruments (e.g., operator panels) is very easily possible.

The following table shows where the constituents of the technology packet TP are loaded within the control: either into the engineering system (ES; FIG. 1, FIG. 4, FIG. 8) or into the run-time system (RTS; FIGS. 1 and 4), or into both the engineering system (ES; FIG. 1, FIG. 4, FIG. 8) and also into the run-time system (RTS; FIG. 1, FIG. 4, FIG. 9).

| Component | TP component | is loaded into |
|---|---|---|
| Executable code | Code | RT |
| Parameter interface (and associated information about the individual parameters) | PAR | ES |
| Configuration information (information about how and where the parts are linked in the run system) | FWK | ES + RT |
| User interface (commands (MOVE, POS, . . .) SFCs, SFBs, system variables, . . .) | SPR | ES + RT |
| User interface (graphical information) | SPR | ES |
| Descriptive information for system variables, alarms, . . . | ACC | ES + RT |
| Object types (technological objects) | TO | ES + RT |
| Version information for consistency between RT, packets and objects | ACC | ES + RT |

Figure 7:
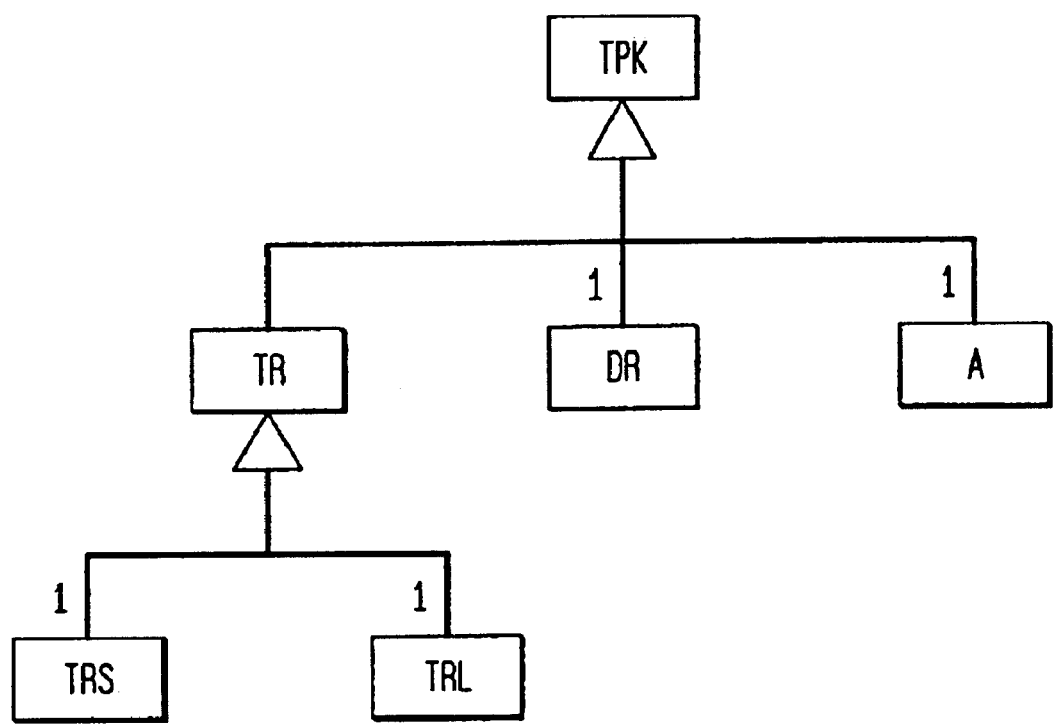

In the illustration according to FIG. 7, possible technology object types (TO; FIG. 6) are illustrated as an example OO structure diagram for a plastics technology packet (TP; FIG. 6) TPK. For processing or production of plastics, we usually need a temperature control and a pressure control. The pressure, which then must also be controlled by the pressure controller DR, usually builds up along a single axis A, since the material paste is compressed along the axis. In this example for the temperature control, two temperature controllers are present, a fast temperature controller TRS and a slow temperature controller TRL. As is visible from the OO structure diagram, the slow temperature controller TRL and the fast temperature controller TRS are derived from the general temperature controller TR. The two temperature controllers TRS and TRL, the pressure controller DR and the axis A are represented in the current plastics technology packet by four technology object types TO, namely TRS, TRL, DR and A. The quantity (number 1) is used to indicate that in this example, precisely one fast TRS and one slow temperature controller TRL, and also exactly one pressure controller DR and one axis A are used. Behind the fast temperature controller TRS there can be, e.g., a PID controller, behind the slow temperature controller TRL there can be, e.g., a P controller, but these are implementation details that a user of the functionalities of these technology object types in the engineering system (ES; FIGS. 1 and 4) need not bother about. In this way a user can use the functionalities of these technology object types (TO; FIG. 6) in the engineering system (ES; FIGS. 1 and 4) without worrying about the implementation details.

The illustration according to FIG. 8 shows how a loaded programming language feature SPR of a technology packet TP is used and processed in the control. In this example, the command positioning POS, which belongs to a programming language feature SPR of an arbitrary technology packet TP, is loaded into the engineering system ES4 and into one of the system levels of the run-level model of the run-time system RTS4. In the engineering system ES4 this command positioning POS is available to the user as an expansion of the basic available command library used in the engineering system ES4. The user can then use this command positioning POS in his user program AWP as an entirely normal programming language command. The application program AWP which the user has prepared, is then loaded into one of the application levels of the run-level model of the universal control and for execution. If the control when processing the application program AWP conflicts with this positioning command POS, then the associated code, which was already loaded in one of the system levels, is processed. For reasons of simplicity, the further content of the technology packet TP is indicated by three dots. In addition, the programming language feature SPR can contain additional commands besides the positioning command POS, which is likewise indicated by three dots.

One important advantage of this design resides in the fact that loading of the executable code for the programming language features into the system level occurs automatically, i.e., without intervention of the operator. Once a programming language features has been loaded or installed in the engineering system ES4, it can be used by the operator more or less like plug & play.

The illustration according to FIG. 9 shows that a common interface API can be used within a universal motion control in order to integrate the technology object types TO A, TO B, TO C. This Application Program Interface API of the universal motion control thus forms a kind of middleware platform for the integration and communication of technology object types TO. In addition, this interface API also enables communication between the technology object types TO and the run-time system RTS4 of the control. By using this consistent interface, even externally produced technology packets (TP; FIG. 6) with their technology object types (TO; FIG. 6) can be integrated into the universal motion control as a kind of "third party technology packet." This will open up a market for externally produced technology packets (TP; FIG. 6) with specific functionality for industry-specific technologies (e.g., spring coiling or injection molding). Thus a user will have the opportunity to start with a required basic inventory of functionality and to expand a control successively by adding specific required functionalities.

What is claimed is:

1. A motion controller having a consistent run-level model for performing combined programmable logic control and numerical control tasks, the motion controller comprising:
   a technology packet comprising a plurality of technology objects; and
   an interface for loading the functionality of a plurality of industry-specific technologies in the form of at least one externally loadable technology object, wherein the at least one externally loadable technology object comprises one of the plurality of technology objects of the technology packet.

2. The motion controller according to claim 1, wherein the technology packet further comprises code parts that are inserted within the run-level model for execution.

3. The motion controller according to claim 2, wherein the technology packet further comprises a configuration part that specifies the integration and execution sequence of the code parts within the run level model.

4. The motion controller according to claim 1, wherein the technology packet further comprises a parameter part that allows a user to assign parameters to the plurality of technology objects of the technology packet.

5. The motion controller according to claim 1, wherein the motion controller comprises an available command library and wherein the technology packet further comprises programmable language features that provide an expansion of the available command library.

6. The motion controller according to claim 1, wherein the technology packet further comprises a description part that comprises a description of programming language elements included in the technology packet.

7. The motion controller according to claim 6, wherein the description part contains a description of system variables used in the technology packet.

8. A method for providing universal motion control using a motion controller having a run-time system and engineering system, the method comprising the steps of:
   providing combined programmable logic control tasks and numerical control tasks using a consistently configurable run-level model; and
   dynamically loading function code into the run-time system and engineering system based on the run-level model.

9. The method according to claim 8, wherein the function code resides within at least one technology packet.

10. The method according to claim 9, wherein the at least one technology packet comprises:
    code parts relating to the operation of the run-time system; and
    a configuration part relating to the allocation of the code parts to a respective system level, wherein information relating to the configuration part is transmitted to the engineering system.

11. The method according to claim 10, wherein the configuration part specifies the integration and execution sequence of the code parts within the run level model.

12. The method according to claim 9, wherein the at least one technology packet further comprises a plurality of technology objects for providing control functionalities to the run-time system.

13. The method according to claim 12, wherein the at least one technology packet further comprises a parameter part that allows a user to assign parameters to the plurality of technology objects of the technology packet.

14. The method according to claim 9, wherein the at least one technology packet further comprises programmable language features that provide an expansion of an available command library.

15. The method according to claim 9, wherein the technology packet further comprises a description part that comprises a description of programming language elements included in the technology packet.

16. The method according to claim 15, wherein the description part comprises a description of system variables used in the technology packet.

17. A motion controller for performing combined programmable logic control and numerical control tasks, the motion controller comprising:
    at least one technology packet that includes a plurality of technology objects; and
    an application program interface that provides integration of the plurality of technology objects and communication between the plurality of technology objects
    wherein the at least one technology packet comprises an externally-produced technology packet for providing functionality for industry-specific technologies.

18. The motion controller of claim 17, further comprising a run-time system, wherein the application program interface enables communication between the run-time system and the plurality of technology objects.

* * * * *